United States Patent
Hershey et al.

(10) Patent No.: US 8,345,526 B2
(45) Date of Patent: Jan. 1, 2013

(54) NON-BINARY HOLOGRAMS FOR INCREASED CAPACITY

(75) Inventors: John Erik Hershey, Ballston Lake, NY (US); Kenneth Brakeley Welles, Scotia, NY (US); John Anderson Fergus Ross, Niskayuna, NY (US); Xiaolei Shi, Niskayuna, NY (US); Zhiyuan Ren, Malta, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/981,279

(22) Filed: Dec. 29, 2010

(65) Prior Publication Data

US 2012/0170437 A1 Jul. 5, 2012

(51) Int. Cl.
*G11B 7/00* (2006.01)
(52) U.S. Cl. ....................................... 369/103
(58) Field of Classification Search .............. 369/103, 369/275.4, 94, 100
See application file for complete search history.

(56) References Cited

U.S. PATENT DOCUMENTS

| 5,557,592 A * | 9/1996 | Kobayashi et al. ......... 369/275.4 |
| 5,786,117 A * | 7/1998 | Hoshi et al. .................... 430/21 |
| 2002/0015376 A1 | 2/2002 | Liu |
| 2003/0223341 A1 * | 12/2003 | Minagawa ................. 369/59.22 |
| 2004/0085878 A1 * | 5/2004 | Sakagami et al. ......... 369/59.23 |
| 2004/0250749 A1 * | 12/2004 | Akselrod et al. ................ 117/13 |
| 2005/0185233 A1 * | 8/2005 | Baba et al. ........................ 359/9 |
| 2006/0109769 A1 * | 5/2006 | Yamamoto et al. ........... 369/103 |
| 2009/0092034 A1 * | 4/2009 | Tanabe et al. .............. 369/275.3 |
| 2010/0008206 A1 * | 1/2010 | Jeong ............................ 369/103 |
| 2010/0157773 A1 * | 6/2010 | Welles et al. ................. 369/103 |
| 2010/0157774 A1 | 6/2010 | Ren |
| 2011/0044151 A1 * | 2/2011 | Mori et al. .................... 369/103 |
| 2011/0080815 A1 | 4/2011 | Mikami |

FOREIGN PATENT DOCUMENTS

WO 9939248 A1 8/1999

OTHER PUBLICATIONS

EP Search Report, Application No. 11194057.3-1232; Mar. 29, 2012; 9 pages.

* cited by examiner

*Primary Examiner* — Thang Tran
(74) *Attorney, Agent, or Firm* — Jean Testa; Fletcher Yoder

(57) ABSTRACT

Techniques are provided for increasing storage capacity in a holographic storage system. While typical holographic storage systems involve binary storage for each data position in a holographic disk, present techniques involve storing data such that more than two data levels may be recorded in each data position. In some embodiments, a recording beam directed to the disk may be adjusted to different power levels depending on the data level to be recorded. Furthermore, the recording time at a data position may be adjusted to increase the energy directed to the data position by increasing the amount of time the recording beam is impinged on the data position. Embodiments are suitable for different types of holographic storage, including dye-based medium.

18 Claims, 4 Drawing Sheets

NON-BINARY HOLOGRAMS FOR INCREASED CAPACITY

BACKGROUND

The present techniques relate generally to bit-wise holographic data storage techniques. More specifically, the techniques relate to methods and systems for increased holographic storage capacity.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disc, developed in the early 1980s, has a capacity of around 650-700 MB of data, or around 74-80 minutes of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. Holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. Some configurations of holographic storage disks involve storing micro-holograms in multiple data layers, each having multiple parallel tracks. As holographic technology advances, even greater storage capacity may be desired. However, increasing the micro-hologram storage density to increase storage capacity in holographic systems may result in increased bit-error rates. Techniques for increasing holographic storage capacity without increasing bit-error rates are desired.

BRIEF DESCRIPTION

An embodiment of the present techniques provides a method of recording data from a holographic disk. The method includes determining a target data level of a plurality of data levels to be written to a target data position on the holographic disk. The plurality of data levels may include three or more different data levels. The method also includes adjusting a power of a recording beam based on the target data level and emitting the recording beam at the adjusted power to record data at the target data level at the target data position.

Another embodiment provides a method of recording data from a holographic disk. The method includes determining a target data level of a plurality of data levels to be written to a target data position on the holographic disk, where the plurality of data levels includes three or more different data levels. The method also includes determining a recording time in the target data position based on the target data level, where the recording time comprises a length of time a recording beam is impinged on the target data position and emitting the recording beam for the recording time at the target data position to record data in the target data position at the target data level.

Another embodiment provides a method of recording data from a holographic disk. The method includes determining a target data level of a plurality of data levels to be written to a target data position on the holographic disk, where the plurality of data levels includes three or more different data levels. The method further includes determining a pulse shape of a recording beam based on the target data level, where the pulse shape is a function of power and time, and emitting the recording beam according to the determined pulse shape at the target data position to record data in the target data position at the target data level.

Some embodiments include a method of recording data from a holographic disk. The method includes determining a target data level of a plurality of data levels to be written to a target data position on the holographic disk, where the plurality of data levels includes three or more different data levels. The method further includes determining a focus position of a recording beam based on the target data level and emitting the recording beam at the focus position to alter a grating fringe at the target data position to form one of a plurality of grating patterns, each corresponding to one of the plurality of data levels to the record data in the target data position at the target data level.

Yet another embodiment provides a holographic recording system. The holographic recording system includes a holographic storage disk and an optical system. The holographic storage disk includes a plurality of data positions, each configured to be recordable in a plurality of quantization levels, where the plurality of quantization levels includes three or more quantization levels. The optical system is configured to direct a recording condition to a target data position of the plurality of data positions to record data in the target data position at any of the plurality of quantization levels.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
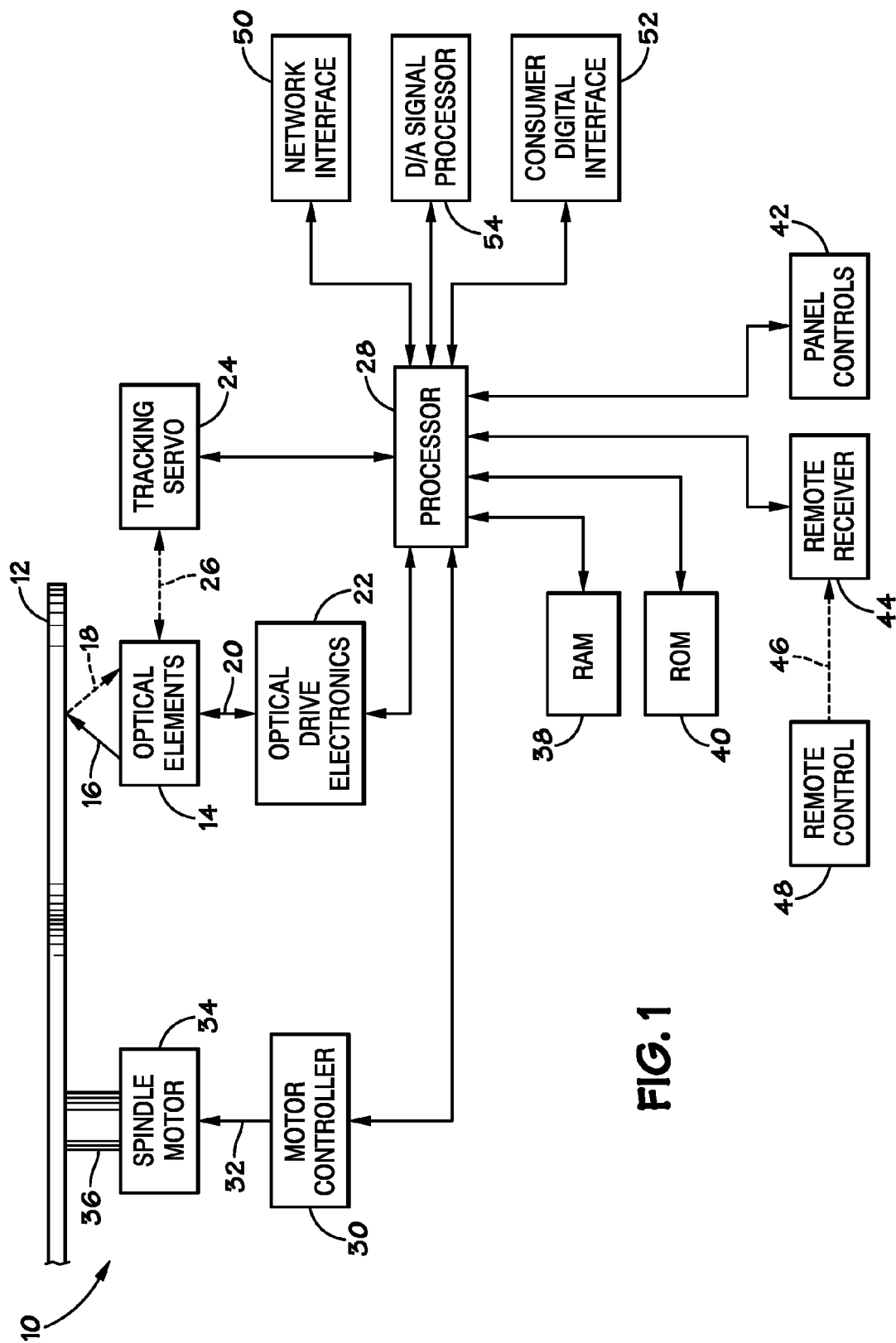
FIG. 1 is a block diagram of a holographic storage system, in accordance with embodiments.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Data in a holographic storage system is stored within a photosensitive optical material using an optical interference pattern that allows data bits to be stored throughout the volume of the optical material. Data transfer rates in a holographic storage system may be improved, as millions of bits of holographic data may be written and read in parallel. Furthermore, multilayer recording in holographic storage systems may increase storage capacity, as holographic data may be stored in multiple layers of an optical disc. To record data in a holographic storage system, a recording beam (e.g., a laser) may be directed to a particular depth in the media and focused on a target layer, or the layer on which data is to be recorded. The recording beam may further be focused on a target data positionin a target layer on which data is to be recorded. The recording beam generates a photochemical change at the layer and/or data position where the laser is focused, writing the data. In some holographic storage disk configurations, the disk includes dye material in the writable portion of the substrate, and the recording beam converts the dye material into a micro-hologram. In other holographic storage configurations, the disk includes pre-recorded micro-holograms in the medium which may be modified by the recording beam to different diffraction gratings.

To read data in a multilayer holographic storage system, a reading beam may be directed to a data bit position (i.e., the target data position) at a particular layer (i.e., the target data layer) in a holographic disk, and the reading beam may pass through the surface of the holographic disk to interact with the micro-hologram pattern at the data bit position. The interaction of the reading beam at the target data layer may result in a scattering and/or reflecting of the reading beam from the data bit position in the holographic disk. The scattered and/or reflected portions of the reading beam may be referred to as a reflected reading beam or a returned reading beam and may correspond to an initial recording beam condition that recorded the holographic data bit in the data bit position. As such, the reflected reading beam may be detected to reconstruct the data originally recorded in the data bit position on which the reading beam is impinged.

FIG. 1 provides a block diagram of a holographic storage system 10 that may be used to read data from holographic storage disks 12. The data stored on the holographic storage disk 12 is read by a series of optical elements 14, which may be suitable for emitting beams 16 (e.g., a reading beam or a recording beam) and receiving reflections 18 (e.g., including light scatter and/or reflection of the beams 16 by the medium of the disk 12) of the beams from the holographic storage disk 12. The optical elements 14 may include any number of different elements designed to generate excitation beams (e.g., lasers), or other elements such as an optical head configured to focus the beams 16 on the holographic storage disk 12 and/or detect the reflections 18 coming back from the holographic storage disk 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the holographic storage disk 12.

The location of the optical elements 14 over the holographic storage disk 12 is controlled by a servo 24 which has a mechanical actuator 26 configured to move the optical elements with respect to the surface of the holographic storage disk 12. For example, the servo 24 may move the optical elements to compensate for tracking or focusing errors in the reading and/or recording of the disk 12. The optical drive electronics 22 and the servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance, amplify, and/or reduce interferences of the reflected beam 18 or compensate for movement and/or imperfections of the holographic disk 12. In some embodiments, the servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the holographic storage disk 12. As the optical elements 14 are moved from the outside edge of the holographic storage disk 12 closer to the spindle 36, the rotational speed of the optical data disk may be increased by the processor 28. This may be performed to keep the data rate of the data from the holographic storage disk 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. In some embodiments, the ROM 40 includes a look-up table including information corresponding to a reading beam impinged on the holographic disk 12. For example, the look-up table may include a suitable reading beam power for each data layer of the disk 12, as will be further discussed. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the holographic storage disk 12 into a data stream that may be used by other units.

If the holographic storage system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
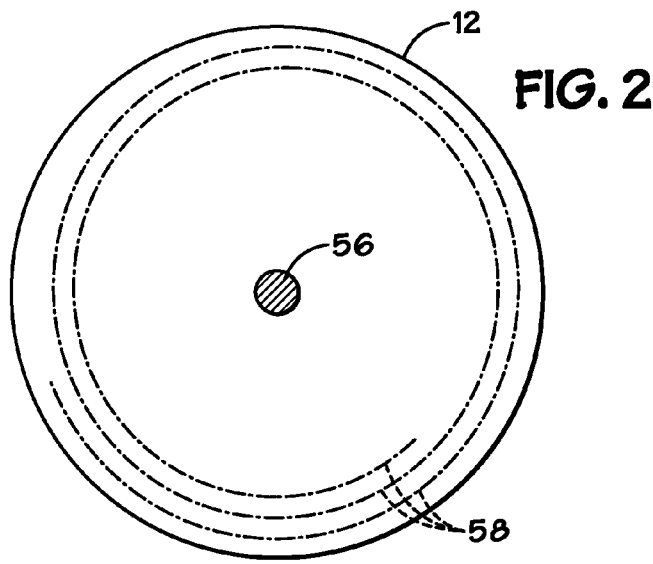
FIG. 2 illustrates a holographic disk having data tracks, in accordance with embodiments.
Figure 3:
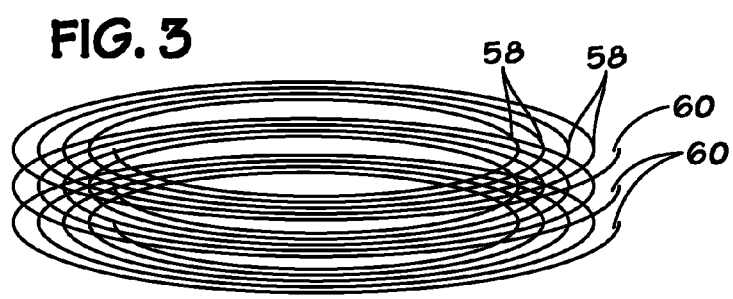
FIG. 3 illustrates multiple data layers of a holographic disk, in accordance with embodiments.

The system 10 may be used to read a holographic storage disk 12 containing data, as shown in FIG. 2. Generally, the holographic storage disk 12 is a flat, round disk with a recordable medium embedded in a transparent protective coating. The protective coating may be a transparent plastic, such as polycarbonate, polyacrylate, and the like. A spindle hole 56 of the disk 12 couples to the spindle (e.g., the spindle 36 of FIG. 1) to control the rotation speed of the disk 12. On each layer, data may be generally written in a sequential spiraling track 58 from the outer edge of the disk 12 to an inner limit, although circular tracks, or other configurations, may be used. The data layers may include any number of surfaces that may reflect light, such as the micro-holograms used for bit-wise holographic data storage or a reflective surface with pits and lands. An illustration of multiple data layers is provided in FIG. 3. Each of the multiple data layers 60 may have a sequential spiraling track 58. In some embodiments, a holographic disk 12 may have multiple (e.g., 50) data layers 60 which may each be between approximately 0.05 μm to 5 μm in thickness and be separated by approximately 0.5 μm to 250 μm.

Typically, holographic storage systems store data in holographic storage disks in the form of binary micro-holograms. During a recording process in a binary micro-hologram storage system, a micro-hologram may be written, or not written, in a target data position of the disk. During a reading process of the disk, a present micro-hologram may indicate a "1" and an absent micro-hologram may indicate a "0" for a target data position being read. However, such holographic storage systems have only two quantization levels at each data position of the disk.

One or more embodiments involve a holographic storage system 10 suitable for reading and/or recording holographic data in a holographic storage disk 12 in more than two quantization levels, also referred to as data levels. For example, each data position of a disk 12 may have 3 or 4 quantization levels, and in some embodiments, the disk 12 may have several (e.g., 8) quantization levels. Thus, each data position may be written to more than only two quantization levels, thus increasing the storage capacity of the disk 12.

Techniques for increasing the storage capacity of a holographic storage disk 12 may be implemented in various embodiments. For example, holographic disks 12 may include dye molecules in the writable medium of the disk 12. Typically, converting the dye molecules at one data position may result in forming a micro-hologram at that data position, resulting in a 1, rather than a 0 at that data position. In accordance with the present techniques, the dye molecules at a target data position may be converted to different degrees, which may be controlled by recording condition of the recording beam. For example, in some embodiments, the recording beam may be emitted with different levels of power, at different time durations, or according to different pulse shapes (e.g., beam shape with respect to power and time duration). The different degrees of dye conversion may be detected in the reflection 18 to determine more than two quantization levels. For example, a present micro-hologram in a data position may reflect a portion of a beam 16 (depending on the degree of dye conversion and/or the configuration of the micro-hologram), while substantially all of a beam 16 may be transmitted through a data position with no micro-hologram.

Figure 4:
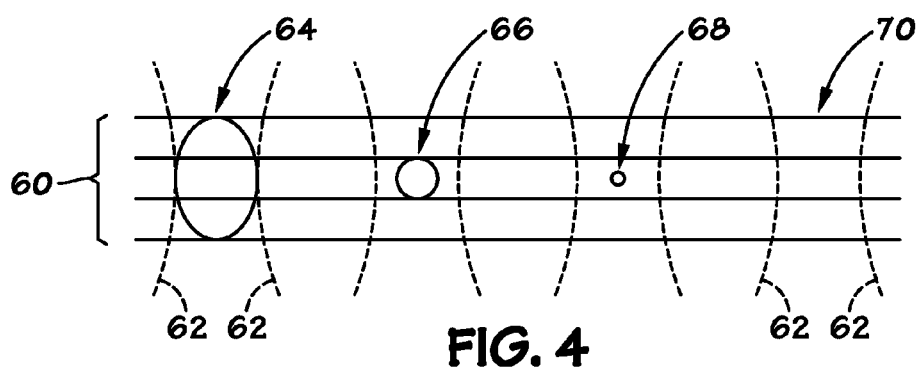
FIG. 4 represents data positions having different levels of dye conversion corresponding to different data levels in a holographic disk, in accordance with embodiments.

FIG. 4 illustrates one data layer 60 of a holographic storage disk 12 having different degrees or levels of dye conversion which correspond to different data levels. The data layer is pre-recorded with micro-hologram gratings. In some embodiments dye molecules in the data layer 60 may be converted in multiple degrees. The dotted area 62 may represent a reading and/or recording beam at the data layer 60 in the disk 12, where a recording beam may record at a certain quantization level, or where a reading beam may read the quantization level from the data position. For example, during a recording process for recording a data position 70 to a first level, substantially no dye molecules may be converted at the data position 70. Thus, a reading beam directed to the data position 70 may return the strongest reflection from a micro-hologram, which may indicate to the holographic storage system 10 that the data position 70 is at a first quantization level.

During a recording process for recording a data position 68 to a second level, a certain amount of dye may be converted at the position 68, such that when a reading beam is directed to the data position 68, the reflection from the micro-hologram may indicate that the data position 68 is at a second quantization level. Similarly, during a recording process for recording to a data position 66 to a third level, a different amount of dye (e.g., a greater degree of dye conversion than the second level quantization at data position 68) may be converted at position 66, such that impinging a reading beam may return a reflection indicating that the data position 66 is at a third quantization level.

Techniques for increasing the storage capacity of a holographic storage disk 12 may also be implemented in holographic disks 12 by varying recording conditions that result in variations of diffraction grating patterns in the medium to more than two quantization levels. In some embodiments, as illustrated in FIG. 5, varying the relative phase between the recording beam and reference beam may generate grating structures having different fringe pattern. In a reading process, a reading beam may be directed to a target data position having the generated structures. Portions of the reading beam may be reflected from the structures, and the reflection may propagate back to an optical head. Depending on the generated structure, the reflection may have a range of signal levels, which may indicate more than two quantization levels. In different embodiments, the disk 12 is pre-recorded with micro-hologram gratings, and the recording beam may focus on different portions (in depth) of the grating, such that different portions of the grating in the data position may be erased, resulting in the recording of data at different quantization levels.

Figure 5A:
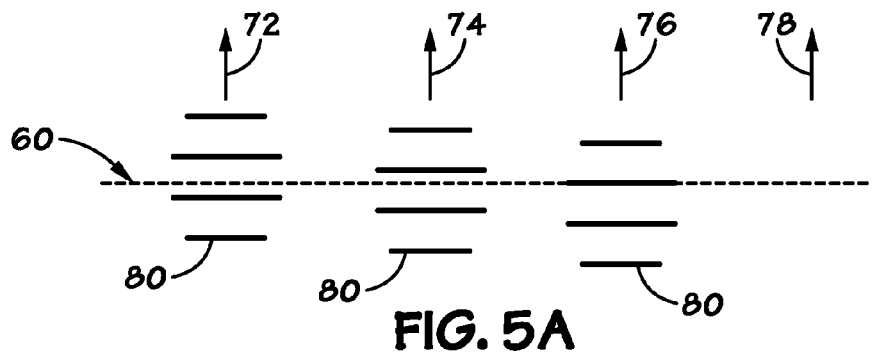
FIG. 5 represents data positions having different data levels formed by different interference gratings, in accordance with embodiments.

FIG. 5A illustrates a data layer 60 of a holographic storage disk 12 having different grating patterns 80 which return more than two levels of quantization. The dotted line may represent a center (in depth) of the data layer 60. In some embodiments, a recording process involves recording different grating envelope patterns 80 having centers at different depths with respect to the center of the data layer 60. For example, each of the grating patterns 80 at data positions 72, 74, and 76, may have envelope centers at different locations with respect to the center of the data layer 60. Comparable to the embodiment described with respect to FIG. 4, embodiments involving holographic storage using grating patterns 80 with displaced envelope centers may also return reflections with multiple levels of intensity. For example, the data position 78 may not include a grating pattern 80, and when a reading beam is impinged on the data position 78, the reflected beam may substantially transmit through the data position 78 and may not interfere with the reading beam, indicating that the data position 78 is at a first quantization level. The shifts in grating pattern centers of the grating patterns 80 at data positions 76, 74, and 72 may each interfere differently with an impinged reading beam, resulting in a returned reflection indicative of different quantization levels (e.g., a second, third, and fourth quantization level).

Figure 5B:
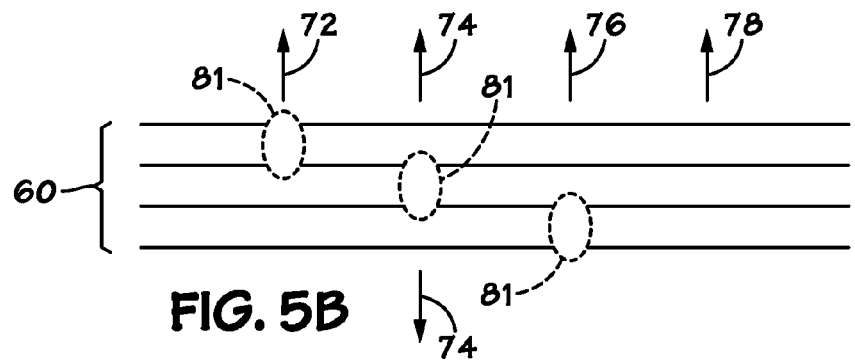

Similarly, pre-recorded grating patterns may be erased to produce holographic data having multiple levels of quantization, in accordance with the present techniques. For example, as illustrated in FIG. 5B, the solid lines represent fringes of pre-recorded gratings throughout the data layer 60. A recording beam may interfere with different portions of the pre-recorded gratings, such that grating erasures 81 may be at different depths of the pre-recorded gratings of the data layer at different data positions 72, 74, and 76. Additionally, the gratings at some data positions (e.g., data position 78) may not be erased. A reading beam impinged on any of the data positions 72, 74, 76, or 78 may return a reflection having a different intensity which corresponds to multiple (e.g., four in this illustration) levels of quantization.

Figure 6:
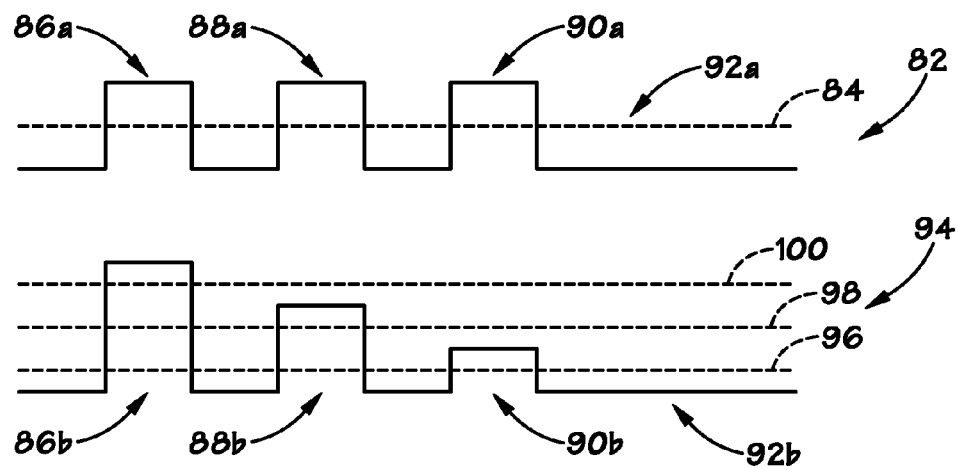
FIG. 6 is a diagram of a detector signal having two data levels and a uniform detector signal having three or more data levels, in accordance with embodiments.
Figure 7:
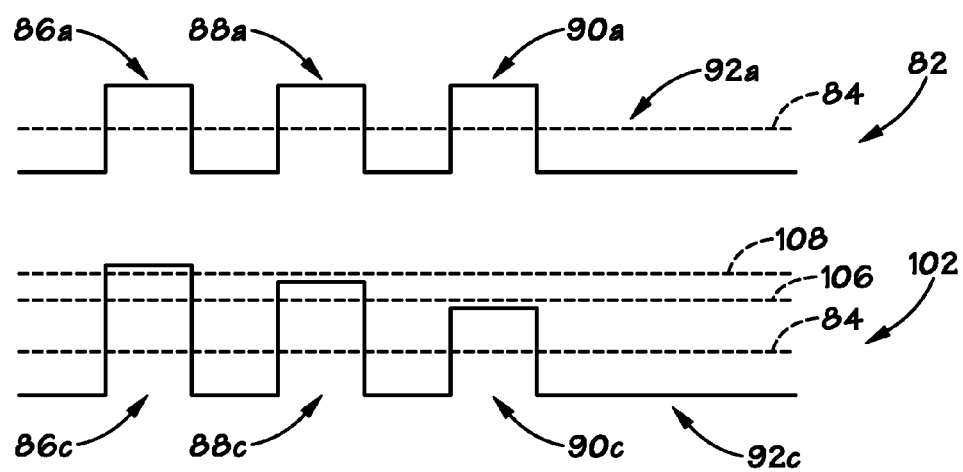
FIG. 7 is a diagram of a detector signal having two data levels and a non-uniform detector signal having three or more data levels, in accordance with embodiments.

In a reading process of the present techniques, the different quantization levels of data stored in the holographic disk 12 may be determined based on the returned reflections. A detector (e.g., an optical head in the optical elements 14 of FIG. 1) in the holographic storage system 10 may generate a signal representing an intensity distribution of the light received. Examples of such signals are illustrated in FIGS. 6 and 7. The signals illustrated in FIGS. 6 and 7 may be represented with respect to time, or represented with respect to a data position being read, as constant linear velocity is assumed, and data positions are assumed to occur in constant time periods.

As illustrated in the diagram of FIG. 6, a detector may receive the reflections from the disk 12 and generate a signal representing an intensity distribution of light received over data positions being read. In typical binary holographic storage systems, the signal 82 may have two relevant levels, where one level is below a threshold 84, indicating that no micro-hologram is detected, and one level is above the threshold 84, indicating that a micro-hologram is detected. For example, at data positions 86a, 88a, and 90a, a micro-hologram may be detected, while at data position 92a, no micro-hologram is detected.

In one or more embodiments, a signal 94 generated by a detector may have more than two relevant levels. For example, the intensity distribution of light received at the data position 86b may be above a first threshold 100, indicating a certain quantization level. Similarly, the intensity distribution of light received at data positions 88b and 90b may be above other thresholds 98 and 96, respectively. As such, the signal 94 may indicate that the data positions 88b and 90b have been recorded to two different quantization levels. Finally, no thresholds may be met at the data position 92b, which may indicate that no micro-hologram is detected at the data position 92b. By generating a signal 94 having more than two relevant levels, the holographic storage system 10 may detect multiple quantization levels. In different embodiments, the signal 94 may have uniform levels, or uniform thresholds. For example, in forming different levels of micro-holograms, the degree of dye conversion in some embodiments may be incrementally increased, or the depth or position of grating patterns may be incrementally altered.

In other embodiments, a signal may also have non-uniform levels, as illustrated in FIG. 7, which compares a typical signal 82 of a binary holographic storage system with a non-uniform detector signal 102 having more than two data levels. Embodiments involving non-uniform signals may be more easily implemented in existing holographic storage systems, as the optical components 14 in the system 10 may already be suitable for detecting a micro-hologram at one threshold 84. The system 10 may be reconfigured to detect micro-holograms at the threshold 84, as well as at additional thresholds 106 and 108. For example, the returned intensity distribution at data positions 86c and 88c may be non-uniformly different and greater than the returned intensity distribution at data position 90c. The signal portions corresponding to each of the data positions 86c, 88c, and 90c may indicate three different quantization levels. Therefore, in this example, four quantization levels may be achieved.

Figure 8:
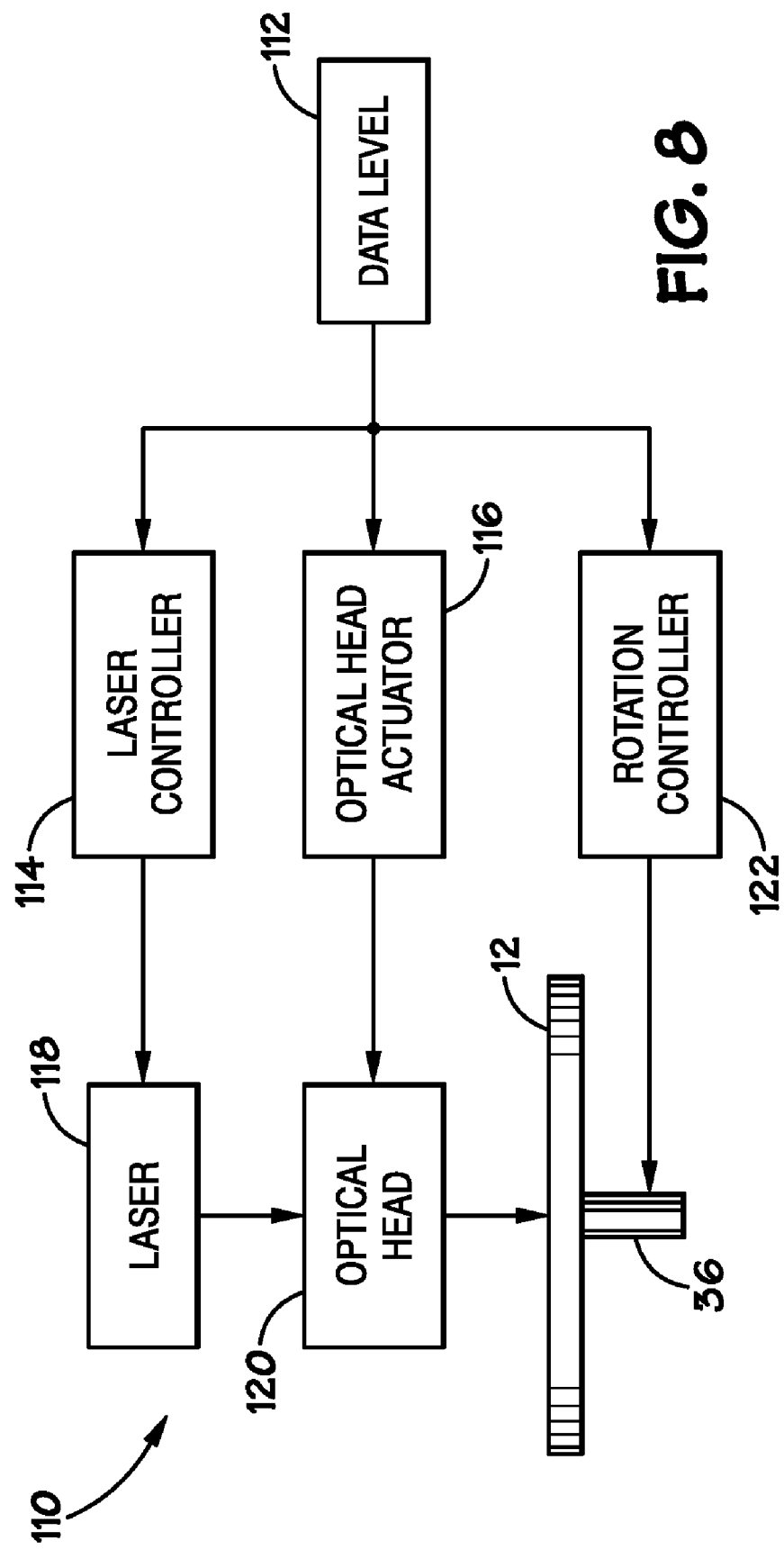
FIG. 8 is a diagram of a recording system suitable for recording micro-holograms at three or more data levels, in accordance with embodiments.

The block diagram of FIG. 8 illustrates a recording system 110 suitable for recording micro-holograms at more than two data levels. The system 110 may include a laser 118 which generates a recording beam and an optical head 120 which emits the recording beam into a holographic disk 12. The laser 118 may emit light at a power controlled by the laser controller 114, and components in the optical head 120 may be actuated by the optical head actuator 116. The laser 118 and the laser controller 114 may be part of the optical drive electronics 22 from FIG. 1, for example, while the optical head actuator 116 may be part of the servo 24. The system 110 may also include a rotation controller 112 (or a spindle controller) which may control the rotational speed (i.e., angular velocity) of the disk 12 about a spindle 36 during recording. For example, the rotation controller 112 may be part of the motor controller 30.

As the system 110 may record micro-holograms at more than two data levels 112, various components of the system may be engaged and/or adjusted depending on the data level 112 to be written. In some embodiments, the data level 112 to be written on the disk 12 may be provided to the system 110. For example, a processor 28 may provide the data level 112 to the laser controller 114, which may adjust the power of the recording beam emitted by the laser 118. The laser 118 may be controlled to emit recording beams at different increments of power to form different levels of data (e.g., different degrees of dye conversion, different grating patterns, etc.) in the disk 12. By adjusting the power of the recording beams impinged on a data position, different levels of energy may be directed to the data position to modify the medium (e.g., dye molecules of grating structures) to be indicative of different levels of data. For example, in some embodiments, the laser controller 114 may control the recording beam emitted by the laser 118 to different power levels in a range of recording beam power levels. In some embodiments, components (e.g., lenses) in the optical head 120 may be actuated based on the power of the reading beam. Therefore, the optical head actuator 116 may also receive the data level 112 and actuate components in the optical head 120.

In some embodiments, data positions may be recorded at different levels of energy by varying the recording time at a data position, or the amount of time in which a recording beam is impinged on the data position. The rotation controller 122 may control the angular velocity of the disk 12 rotation about the spindle 36. In some embodiments, the data level 112 may be provided to the rotation controller 122, which may adjust the rotation of the disk 12 such that the optical head 120 may impinge the recording beam on a target data position for a sufficient duration to write data at a certain data level. For example, the rotation controller 112 may adjust the rotation of the disk 12 such that the optical head 120 impinges a recording beam for different recording times in a range of recording times to write data at different data levels. Furthermore, in some embodiments, may adjust the recording beam to have different pulse shapes (e.g., beam power with respect to time) to write data at different data levels.

In one or more embodiments, the adjustable parameters for recording different data levels to a data position may be determined by using a look-up table. For example, the laser controller 114 and/or the rotation controller 112 may determine a recording beam power and/or a recording time, respectively, using a look-up table, once the data level 112 is provided. Alternatively, each of the laser controller 114 and/or the rotation controller 112 may use algorithms and data to dynamically determine an appropriate recording beam power and/or recording time based on the provided data level 112.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A holographic recording system comprising:
a holographic storage disk comprising a plurality of data positions, each configured to record micro-holograms in a plurality of quantization levels, wherein the plurality of quantization levels comprises at least a first quantization level, a second quantization level, and a third quantization level; and
an optical system configured to direct a recording beam to a target data position of the plurality of data positions to record data in the target data position based at least in part on the plurality of quantization levels and a plurality of recording conditions of the recording beam, wherein the at least first quantization level, the second quantization level, and the third quantization level each correspond to a different one of the plurality recording conditions, and wherein the plurality of recording conditions comprises a plurality of power levels, time durations, and pulse shapes.

2. The system of claim 1, wherein the optical system comprises an optical head and an optical head actuator, wherein the optical head actuator is configured to actuate one or more components of the optical head based on the recording condition of the recording beam directed to the target data position.

3. The system of claim 1, comprising a spindle controller configured to rotate the holographic storage disk such that the recording beam directed to the target data position results in recording data in the target data position at any of the plurality of quantization levels.

4. The system of claim 1, wherein the optical system comprises a detector configured to:
detect a reflection of the recording beam from the holographic storage disk, wherein the reflection of the recording beam is indicative of recorded data in the target data position; and
generate a signal indicative of any of the plurality of quantization levels of data recorded in the target data position.

5. The system of claim 4, wherein the signal comprises three or more signal levels.

6. The system of claim 5, wherein the three or more signal levels comprises three or more power levels or three or more phases.

7. The system of claim 4, wherein the detector is configured to generate a signal comprising a plurality of regularly spaced thresholds, wherein each of the plurality of regularly spaced thresholds corresponds with one of the plurality of quantization levels.

8. The system of claim 4, wherein the detector is configured to generate a signal comprising a plurality of irregularly spaced thresholds, wherein each of the plurality of irregularly spaced thresholds corresponds with one of the plurality of quantization levels.

9. The system of claim 4, wherein the signal is generated with respect to time and a phase and an intensity distribution of the reflection.

10. The system of claim 1, wherein the holographic storage disk comprises dye molecules in medium, wherein each of the plurality of data positions comprises dye molecules configured to be converted by the recording beam energy to achieve a refractive index change 11. The system of claim 10, wherein the dye molecules in each of the plurality of data positions are configured to be converted to a plurality of different degrees, each corresponding to one of the plurality of data levels.

12. The system of claim 1, wherein the holographic storage disk comprises a plurality of gratings, wherein each of the gratings are configured to be adjustable in response to the recording condition to a plurality of configurations.

13. The system of claim 12, wherein each of the configurations results in one of a plurality of signal levels with a reading beam impinged to the holographic storage disk during a reading process.

14. A holographic recording system comprising:
a holographic storage disk comprising a plurality of data positions, wherein each data position of the plurality of data positions is configured to record micro-holograms in a plurality of quantization levels, and wherein the plurality of quantization levels comprises three or more quantization levels; and an optical system configured to:
- determine a target quantization level of the plurality of quantization levels to be written to a target data position of the plurality of data positions in the holographic disk;
- determine a recording condition in the target data position based on the target quantization level; and
- emit a recording beam having the recording condition to the target data position to record data in the target data position at the target quantization level.

15. The system of claim 14, wherein the recording condition comprises a power level.

16. The system of claim 14, wherein the recording condition comprises a recording time.

17. The system of claim 14, wherein the recording condition comprises a pulse shape, wherein the pulse shape is a function of power and time.

18. The system of claim 14, wherein the recording condition comprises a focus position and wherein the optical system is configured to emit the recording beam at the focus position to alter a grating fringe target data position.

* * * * *